United States Patent [19]
Carnall

[11] Patent Number: 6,002,938
[45] Date of Patent: Dec. 14, 1999

[54] MOBILE TELEPHONE WHICH INHIBITS AN OPERATION OF AN INDICATION FOR A CALLING TELEPHONE REQUESTING COMMUNICATION

[76] Inventor: Murat Anthony Carnall, Cragg Hill Farm, Cragg Hill, Off Wood Lane, Horsforth Leeds, United Kingdom, LS18 4PE

[21] Appl. No.: 08/720,312

[22] Filed: Sep. 27, 1996

Related U.S. Application Data

[62] Continuation of application No. 08/572,383, Dec. 14, 1995, abandoned, which is a continuation of application No. 08/284,637, filed as application No. PCT/GB93/02257, Dec. 15, 1993.

[30] Foreign Application Priority Data

Dec. 15, 1992 [GB] United Kingdom .................... 9226104

[51] Int. Cl.$^6$ ...................................... H04Q 7/32
[52] U.S. Cl. .............................................. 455/463
[58] Field of Search ...................... 455/463, 462, 455/403

[56] References Cited

U.S. PATENT DOCUMENTS

| | | |
|---|---|---|
| 3,829,616 | 8/1974 | Blouch . |
| 4,446,334 | 5/1984 | Groff . |
| 4,571,455 | 2/1986 | Labock et al. . |
| 4,677,660 | 6/1987 | Yoshida .................................. 379/100 |
| 4,754,473 | 6/1988 | Edwards ................................... 379/58 |
| 4,837,797 | 6/1989 | Freeny, Jr. ............................... 379/96 |
| 5,036,513 | 7/1991 | Greenblatt .............................. 370/125 |
| 5,062,133 | 10/1991 | Melrose ................................... 379/94 |
| 5,123,043 | 6/1992 | Higashiyama et al. .................... 379/62 |
| 5,151,972 | 9/1992 | Lorenz et al. ............................. 379/93 |
| 5,638,047 | 6/1997 | Orloff et al. ............................ 340/539 |

FOREIGN PATENT DOCUMENTS

| | | | |
|---|---|---|---|
| 1162047 | 8/1969 | United Kingdom ............ | H04M 1/64 |
| 1477736 | 6/1977 | United Kingdom ............ | H04M 1/66 |
| 2203614A | 10/1988 | United Kingdom ............ | H04M 1/66 |
| 2214384A | 8/1989 | United Kingdom ........... | H04M 11/00 |

OTHER PUBLICATIONS

Warner, "Eavesdrops Probed" Wireless Week, Jan. 20, 1997.
Warner, "Stricter Ban Ahead", Wireless Week, Feb. 10, 1997.
Communications Act of 1934.

*Primary Examiner*—William Cumming
*Attorney, Agent, or Firm*—Jenkins & Wilson, P.A.

[57] ABSTRACT

A telephone having a speaker, microphone, processor, control unit, inhibit unit, and audible indicator. When the telephone is used to communicate conventionally with another telephone, for example to enable respective users to speak to each other, electronic signals corresponding to the speech are transmitted to and received by the telephone at an input and output, respectively. The processor electronically processes the signals. Signals from incoming calls are relayed from the input to the speaker, and signals from outgoing calls are relayed from the microphone to the output. The control unit identifies the presence of a command signal with the incoming calls. If a user of another telephone wishes to call the telephone, the user dials the number of the telephone in the conventional way. Immediately after dialing, the user has a predetermined time interval during which to input a command code vis-a-vis the key pad of his other telephone, thereby sending a command signal to the telephone which is identified by the control unit. Identification causes the inhibit unit to inhibit operation of the audible indicator, so that it is not known that the user at the other telephone is eavesdropping.

12 Claims, 3 Drawing Sheets

MOBILE TELEPHONE WHICH INHIBITS AN OPERATION OF AN INDICATION FOR A CALLING TELEPHONE REQUESTING COMMUNICATION

This is a continuation of application Ser. No. 08/572,383 filed on Dec. 14, 1995, now abandoned which is a continuation of application Ser. No. 08/284,637 filed on Aug. 15, 1994, now abandoned, which was filed as PCT/GB93/02557 on Dec. 15, 1993.

FIELD OF THE INVENTION

The present invention relates to telecommunications and is concerned particularly, although not exclusively, with telephones.

SUMMARY OF THE INVENTION

According to a first aspect of the present invention there is provided a telecommunication system comprising a plurality of telecommunications devices arranged, in use, to communicate audio and/or other data with each other, the system comprising first and second telecommunications devices, the first device being arranged to request communication with the second device, wherein the first device is arranged, in use, to transmit a command signal to the second device upon receipt of which the second device is arranged to communicate with the first device.

DESCRIPTION OF THE PREFERRED EMBODIMENTS

Figure 1:
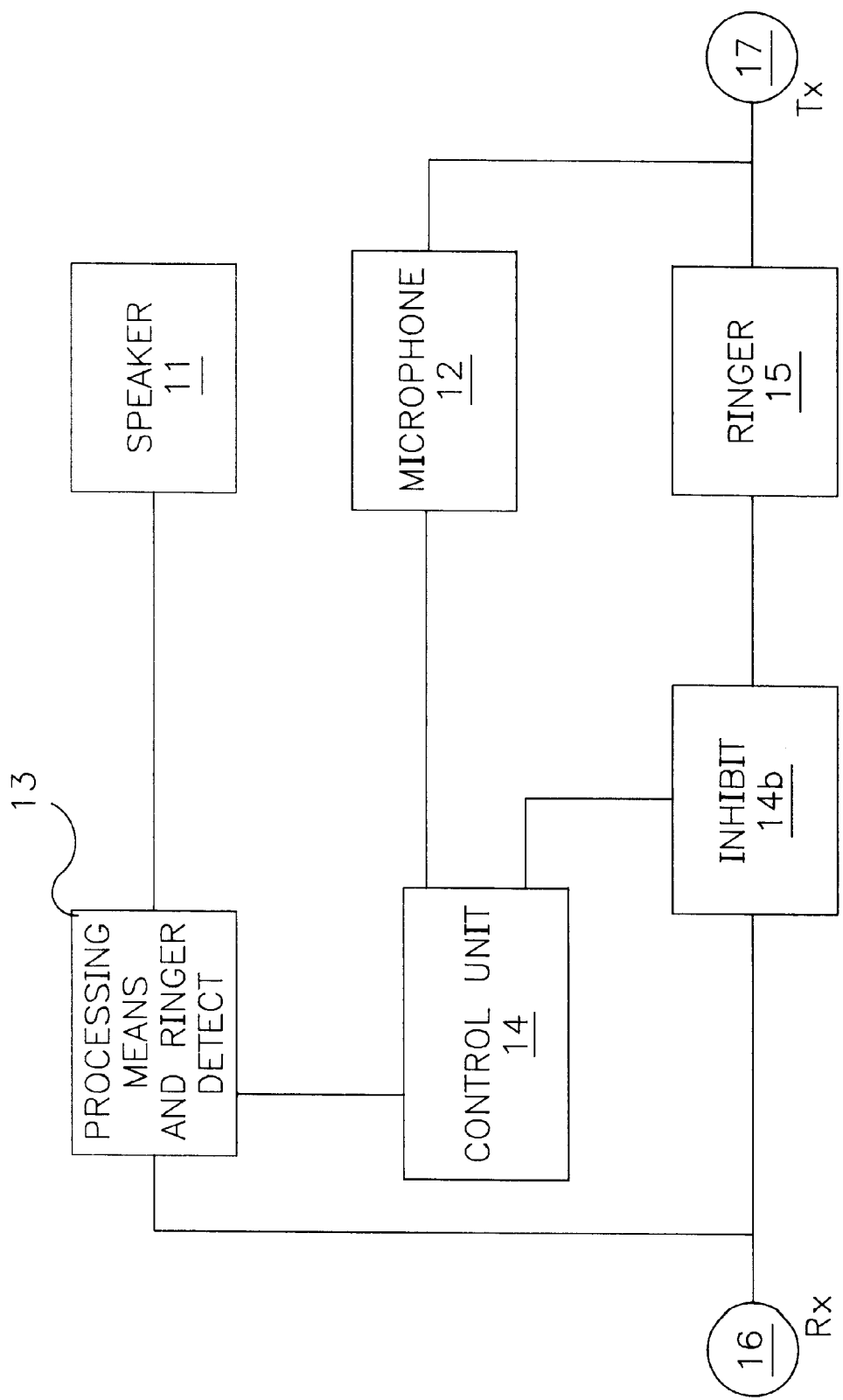
FIGS. 1A and 1B together schematically depict a telecommunication system, and independently, FIG. 1A schematically depicts a receiving telecommunications device of the system, and FIG. 1B schematically depicts a calling telecommunications device (in a representative embodiment) of the system.

Preferably the first telecommunications device is, in use, a calling device and the second telecommunications device is, in use, a receiving telecommunictation device arranged, in use, to receive a call from the calling device.

The receiving device may comprise indication means arranged in use to provide an indication when the calling device requests communication with the receiving device.

The indication means may be arranged to provide a visual indication. Alternatively or additionally, the indication means may be arranged to provide an audible indication.

The receiving device may include inhibiting means to inhibit the operation of the indication means.

Preferably the inhibiting means is activated upon receipt by the receiving device of an inhibit signal from the calling device.

The inhibiting means may be arranged to prevent the operation of the indication means. Alternatively or additionally the inhibiting means may be arranged to diminish the operation of the indication means.

In a preferred arrangement at least one of the calling and receiving telecommunications devices is a telephone. Preferably at least one of the devices is a mobile or portable telephone.

The receiving device may be arranged to receive a request for communication from the calling device, whereupon in the presence of a command signal from the calling device the receiving device communicate with the calling device and in the absence of such a command signal the receiving device is arranged not to communicates with the calling device unless it is made to do so by a user.

The receiving device may be arranged to receive incident audio signals and transmit them via at least one communication medium to the calling device. The receiving device may be arranged to receive incident data signals and to transmit them via at least one communication medium to the calling device.

The or each transmission medium may comprise radio waves. Alternatively or additionally the or each transmission medium may comprise at least one cable.

The system preferably includes control means arranged to control connection of calling and receiving telecommunications devices in response to a request from a calling telecommunications device to connect to a receiving telecommunications device. At least one of the calling and receiving telecommunications devices may be arranged to provide a notification signal to the control means, which notification signal notifies the control means that the command signal has been transmitted from the calling device to the receiving device. Alternatively or additionally either the calling or receiving device may be arranged to provide a notification signal to the control means to notify the control means that an inhibit signal has been transmitted from the calling device to the receiving device.

The notification signal may comprise an electronic signal. The notification signal may comprise a coded signal. Preferably the notification signal comprises a predetermined frequency of electronic or audio signal.

The control means is preferably arranged to store information relating to the number of occasions and/or the length of each occasion on which the calling device has transmitted the command signal and/or the inhibit signal to the receiving device.

Preferably the system is such that a user must make payment for using a calling device of the system to communicate with a receiving device of the system. Payment may be based upon the number of times a user uses the calling device to communicate with a receiving device. Alternatively or additionally the arrangement may be such that payment is based upon the length of time for which the calling device communicates with the receiving device. Alternatively or additionally payment is preferably based upon the number of occasions and/or length of each occasion on which the calling device is made to transmit the command signal and/or the inhibit signal to the receiving device.

The inhibit signal and/or the command signal preferably comprise an electronic signal. Preferably the inhibit signal and/or the command signal comprise a coded signal. In a preferred arrangement the inhibit signal and/or the command signal comprise a digital electronic signal.

Preferably the command signal and the inhibit signal comprise a common signal.

According to a second aspect of the present invention there is provided a receiving telecommunications device arranged, in use, to communicate audio and/or other data with at least one calling telecommunications device, the receiving telecommunications device being arranged to receive from the at least one other device a request for communication, the receiving device being arranged to communicate with the calling device upon receipt of a command signal from the calling device.

The receiving telecommunications device may be as stated in any statement herein. The calling telecommunications device may be as stated in any statement herein.

According to a third aspect of the present invention there is provided a control device for use with a receiving telecommunications device, which receiving telecommunications device is arranged in use to communicate audio and/or other data with a calling telecommunications device, the control device being arranged in use to receive a command signal from the calling telecommunications device whereupon the control device causes the receiving telecommunications device to establish a channel of communication with the calling telecommunications device.

The receiving telecommunications device may have an indicator means arranged to provide an audible and/or visual indication upon receiving a call from a calling device. Preferably the control device is arranged to inhibit the operation of the indicator means upon receipt by the control device of a command signal from the calling telecommunications device.

Preferably the control device is arranged to be located substantially in or adjacent the receiving telecommunications device. The control device may comprise an electronic device and in a preferred arrangement the control device comprises an integrated circuit.

The receiving telecommunications device may be according to any statement herein.

According to a fourth aspect of the present invention there is provided a telecommunications system comprising a calling telecommunications device and a receiving telecommunications device, the devices being arranged in use to communicate audio and/or video data between them, the receiving device having a detector means arranged in use to detect audio and/or other stimuli for communication to the control device, the receiving device being arranged to establish automatically a channel of communication with the calling device upon receipt from the calling device of a request for communication, wherein the calling device is arranged, in use, to send a command signal to the receiving device which command signal causes the detector means to operate.

The detector means may comprise a microphone. Alternatively or additionally the detector means may comprise a modem.

The calling device may be according to any statement herein. The receiving device may be according to any statement herein.

According to a fifth aspect of the present invention there is provided a receiving telecommunications device arranged, in use, to communicate audio and/or other data with at least one calling telecommunications device, the receiving device having detector means arranged, in use, to detect audio and/or other stimuli and to send them to a calling telecommunications device, the receiving device being arranged to establish automatically a channel of communication with the calling device when a request for communication is received from the calling device, wherein the receiving device is arranged to receive from the calling device a command signal which causes the detector means of the receiving device to operate.

The detector means may comprise a microphone.

Alternatively or additionally the detector means may comprise a modem.

The receiving telecommunications device may be according to any statement herein.

According to a sixth aspect of the present invention there is provided a method of establishing communication between a calling telecommunications device and a receiving telecommunications device, the method comprising transmitting from the calling device to the receiving device a command signal which command signal causes the receiving device to establish automatically a channel of communication with the calling device.

The method may include inhibiting the operation of an indicator means of the receiving device upon receipt by the receiving device of a command signal from the calling device.

The method may comprise a method of establishing communication between telephones.

According to a seventh aspect of the present invention there is provided a method of communication between a calling telecommunications device and a receiving telecommunications device, the method comprising transmitting from the calling device to the receiving device a command signal which command signal causes the detector means of the receiving device to operate, which detector means are arranged in use to send detected audio and/or other stimuli to the calling device.

The method may include causing the operation of a microphone of the receiving device by sending the command signal from the calling device to the receiving device. Alternatively or additionally the method may include causing the operation of a modem of the receiving device by sending a command signal from the calling device.

Figure 2:
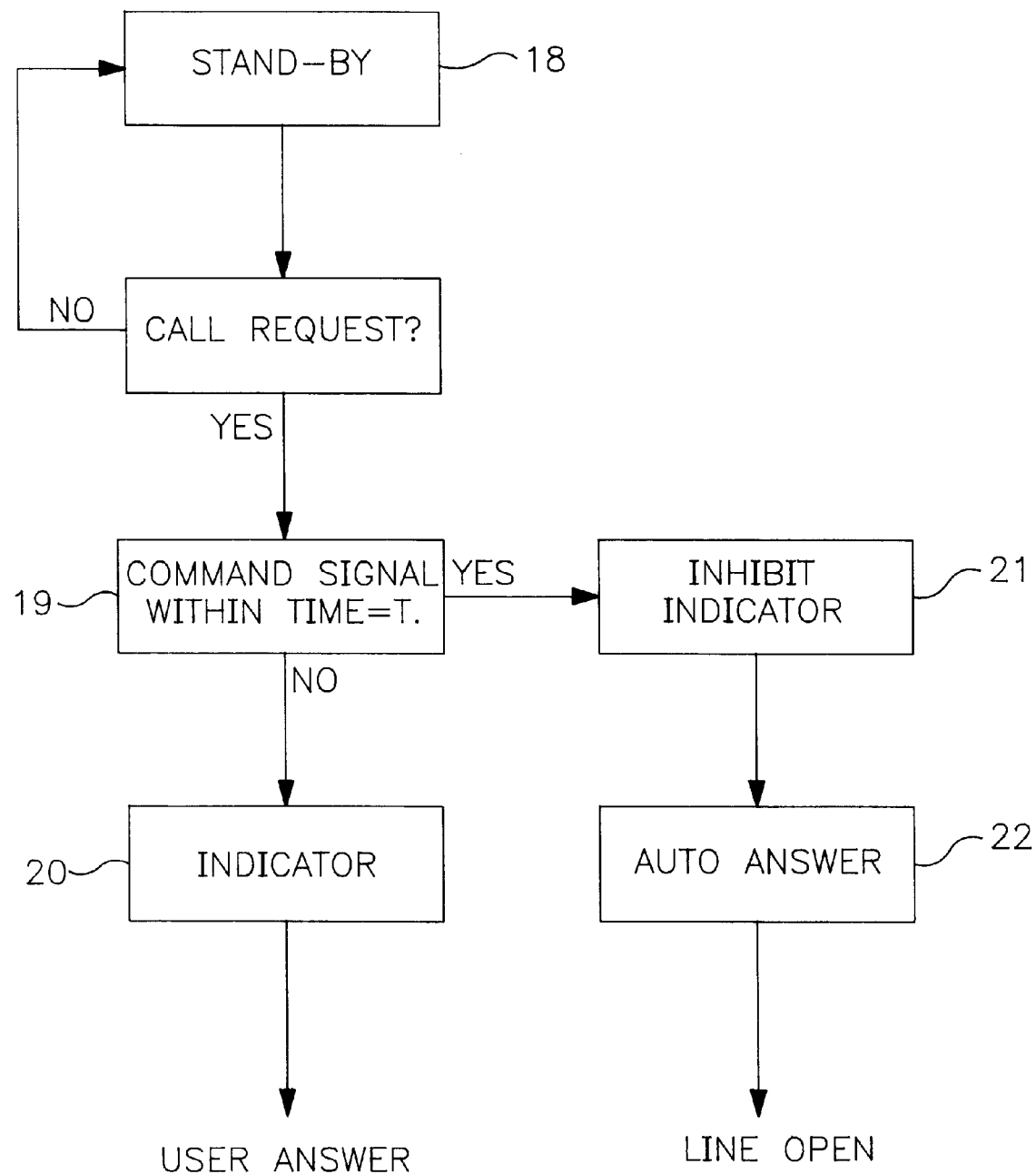
FIG. 2 depicts a flow diagram.
Figure 3:
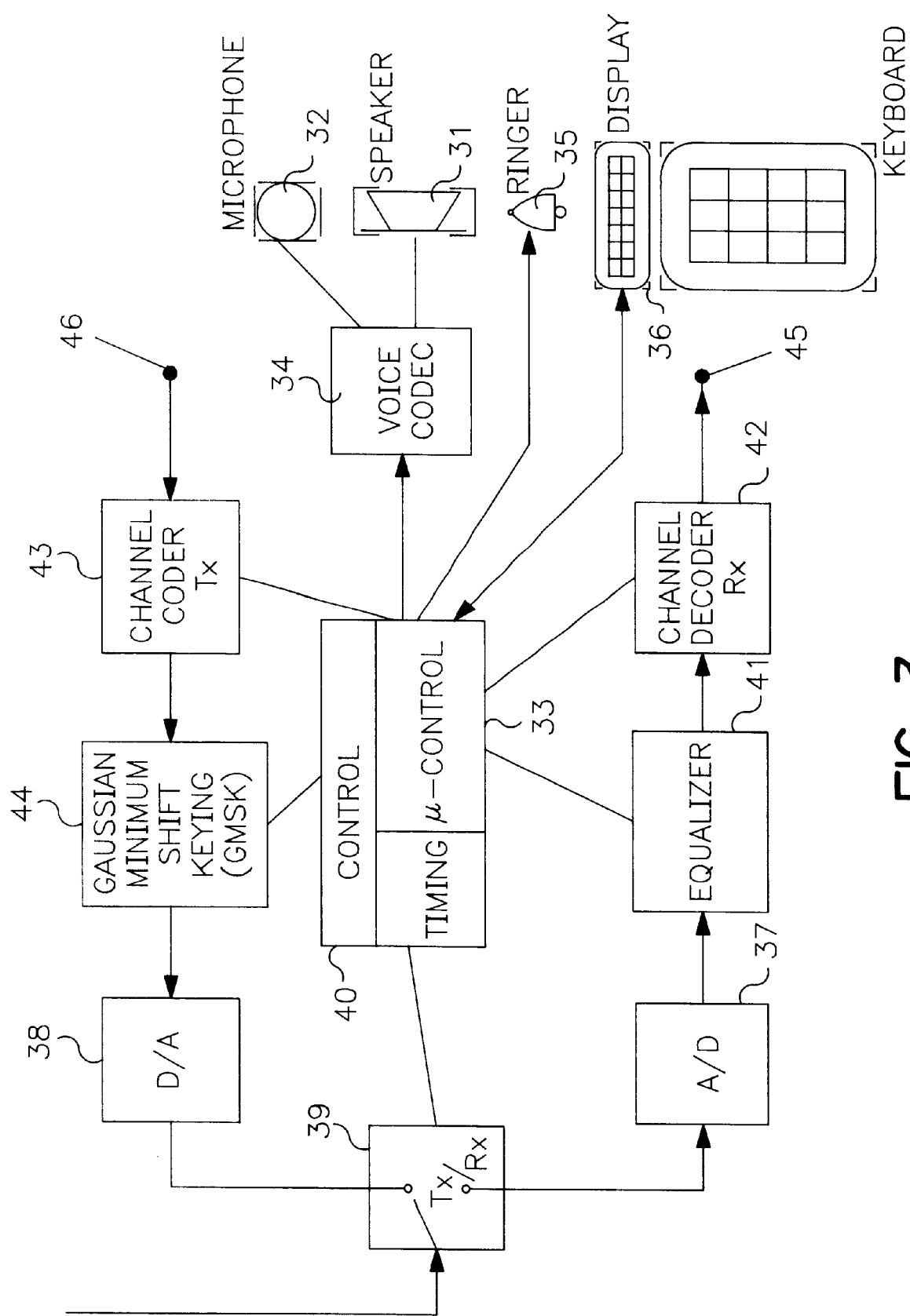
FIG. 3 depicts schematically an alternative embodiment of the present invention.

The invention may be carried into practice in various ways but embodiments will now be described by way of example with reference to the accompanying diagrammatic drawings in which;

FIG. 1A shows schematically a receiving telecommunications and FIG. 1B shows schematically a calling telecommunications device, both FIGS. 1A and 1B being device according to an embodiment of the present invention, and FIG. 2 is a flow diagram of operation of the device of FIG. 1; and FIG. 3 shows schematically a receiving telecommunications device according to an alternative embodiment of the present invention.

Referring to FIG. 1A, this shows generally at 10 a receiving telephone having a speaker 11, a microphone 12, processing means 13, a control unit 14 and an audible indicator 15, and also, referring to FIG. 1B, this shows generally at 100 a calling telephone depicted in a representative embodiment showing the components of a speaker 111, a microphone 112, processing means 113, a control unit 114, an inhibit unit 114b and an audible indicator 115, which are like respective components 11, 12, 13, 14, 14b and 15 of receiving telephone 10. However, as discussed in further detail below, calling telephone 100 does not necessarily have the same respective components as receiving telephone 10 has.

When the receiving telephone 10 is used to conventionally communicate with another telephone, shown as calling telephone 100, for example to enable respective users' of the telephones to speak to each other, electronic signals corresponding to the speech are input to and output from the telephone 10 at input 16 and output 17 respectively. The input 16 and output 17 may be connected to a radio transmitter/receiver (not shown) in the case of a mobile or portable telephone, or may be connected to a telephone line cable in the case of a conventional telephone.

The processing means 13 electronically processes the signals and in the case of incoming signals these are relayed from the input 16 to the speaker 11. In the case of outgoing signals these are relayed from the microphone 12 to the output 17. Conventionally, when calling telephone 100 request communication with the receiving telephone 10, the processing means activates the audible indicator 15 which alerts a user to the incoming call by making an appropriate sound. If the user then wishes to answer the call he establishes the channel or communication by pressing the appropriate button (not shown) or in some cases by lifting the telephone from a mounting location. Once the channel of communication has been established the processing means processes the incoming and outgoing signals in a manner described above.

The purpose of the control unit 14 is to identify the presence of a command signal with the incoming call. If a user of another telephone, shown as calling telephone 100 wishes to call receiving telephone 100, the telephone number of receiving telephone 10 is dialled in the conventional way. However, if during a time interval of predetermined length beginning immediately after the telephone number of telephone 10 is dialled, the caller inputs a command code via his conventional telephone key pad, this sends a command signal to receiving telephone 10 which is identified by control unit 14. Upon identification of the command signal the control unit 14 inhibits the operation of the audible indicator 15, by means of inhibit unit 14b so that no indication is made of the incoming call. Additionally, the control unit 14 automatically establishes the channel of communication, as though the user had answered the call.

Once the channel of communication has been established in this way any sounds detected by the microphone 12 are processed by the processing means 13 and are sent to output 17. The caller can then effectively hear on his own telephone, shown as calling telephone 100, everything which is detected by the microphone 12 in receiving telephone 10. Similarly any sound made by the caller on his calling telephone 100 is emitted from the speaker 11 of telephone 10.

The channel of communication then remains open until the caller chooses to close it by conventionally pressing a cut off button on his telephone, shown as calling telephone 100 or replacing his telephone on its mounting.

FIG. 2 represents, in flow diagram form, the above mentioned operation of receiving telephone 10. At a step 18 the telephone 10 is awaiting calls and is in a so-called "stand-by" condition in which it checks for the presence of a call request in a conventional way. If a call request is detected the control means 14 looks for the presence of a command signal within a predetermined time interval T at a step 19. In the absence of a command signal the operation of the receiving telephone 10 is that of a conventional telephone, ie. the audible indication is given at step 20 and the telephone rings awaiting a user to answer.

If, however, a command signal is present at step 19 the control unit 14 inhibits the audible indication at step 21 by means of inhibit unit 14b of FIG. 1A and automatically establishes the line of communication at step 22. The receiving telephone 10 then operates in a conventional way described above.

The above described embodiment of the invention enables a caller to listen to ambient sounds in the vicinity of receiving telephone 10 from a remote location. A caller can, for example, telephone his house when he is out to check that no one has intruded therein. Since the conventional audible indicate is inhibited, for example either by muting it or suppressing it completely, any intruder need not be alerted to the call. Similarly a mother may for example telephone her hotel room to check whether her baby is crying. The baby would not be disturbed by the call since the audible indication could be suppressed.

The receiving telephone 10 need not take the appearance of a telephone at all. The contents of the device could be incorporated into another appliance, a piece of furniture or even into the fascia of a car for example. In such cases the audible indicator would be removed in case the device was mistakenly called by a user who did not wish to use the command signal.

An alternative embodiment of the invention (not shown) utilises a system known as "call screening". Telephones which have this facility are answered automatically when there is an incoming call without initially causing an indication such as the conventional ringing. The call screening device then invites the user to dial an access code (usually three digits) which, if correct, will activate the ringing and if incorrect will not. The purpose of such device is to enable the user of the receiving telephone to decide which calls he or she will receive.

The receiving telephone is provided with a control unit which activates a microphone of the receiving telephone upon receipt of a command signal from the caller. For example a whistle or other audible signals from the caller may cause the control unit to activate the microphone.

In the event that the caller keys in an incorrect access code the receiving telephone will not ring but the telephone line will not be disconnected until the caller disconnects it, by pressing a button or replacing his telephone on its mounting in the conventional way. This enables the caller to activate the microphone of the receiving telephone without the user of the receiving telephone becoming alerted to this fact.

Use of the device may be charged for separately by telecommunications operating companies. For example in the case of a mobile or portable telephone a charge is made for the number and length of occasions on which the telephone is used. To enable successful monitoring of the command signal service—for which an extra charge per call may be made—either the caller's telephone may be made to notify the operating company upon the selection of the command mode, or alternatively the receiving telephone may be made to make a notification upon receipt of the command signal. In either case notification may be made to the operating company by the presence of a notification signal such as a coded signal or a signal of predetermined frequency when the command service is used.

In the case of conventional ("land-line") telephones the connection is established by the exchange. Accordingly, it would not be possible to send the command signal directly to the receiving telephone without first establishing connection. Because of this, an embodiment of the device described above would have to automatically answer the incoming call for the exchange to make the connection, whilst suppressing the ringing of the receiving telephone. The device would additionally have to generate a synthesised ringing or other audible indication in the caller's telephone whereupon the caller could then transmit a command signal within a predetermined time limit to maintain the established channel of communication without alerting the user of the receiving telephone.

After a predetermined time interval during which no such command signal is transmitted, the device would enable the ringing of the receiving telephone and a conventional telephone call would be possible.

The use of a synthesised ringing signal from the device would not alert a conventional caller to the existence of the facility.

FIG. 3 shows generally at 30 a digital mobile telephone (such as a GSM telephone) having a speaker 31, a microphone 32, a micro-controller 33, a voice codec device 34, an audible indicator/ringer 35, a display (liquid crystal or other) and key-pad 36. When another phone (not shown) communicates conventionally with this telephone, for example to enable respective users of the telephone as they speak to each other, electronic signals corresponding to the speech are input to and output from the telephone 30 at input 37 and output 38 respectively connected to a radio transmitter/receiver which is controlled by a switch 39 and a timer 40. The processing means 33 electronically processes the signals and in the case of incoming signals these are equalised at 41 and decoded at 42 and relayed through the voice codec 34 to the speaker 31. Outgoing signals from the microphone 32 are relayed via the voice codec 34 to the micro-controller 33 then to the channel code 43 and to the modulator 44 and finally to the output 38 for transmission. The control unit 40 and the micro-controller 33 identify the presence of a command signal with the incoming calls. If a user of another telephone (not shown) wishes to call telephone 30, the telephone number of telephone 30 is keyed in the conventional way. However, if a code sequence is added to the telephone number immediately following the telephone number, this is identified by the micro-controller 33. The micro-controller 33 then inhibits the operation of the ringer 35, the display 36, and a speaker 35, so that no indication is made of the incoming call. The micro-controller establishes the channel of communication as though the user had answered the call. If the user of the telephone 30 depresses any key of the key-pad 36, the micro-controller closes the communications channel and resets the telephone 30, speaker 31, ringer 35 and display 36 to normal operation.

Although the invention has been described above in relation to telephones, it may with suitable modification be used with other devices such that for example a code may activate a modem which relays data to the caller or calling device which download the data onto a computer.

I claim:

1. A telecommunication system comprising a plurality of telephones for communicating audio data with each other, the system comprising first and second telephones, the first telephone, in use, comprising a calling telephone and the second telephone comprising a mobile telephone which, in use, comprises a receiving telephone, the receiving telephone being adapted to receive a call from, a command signal from, and an inhibit signal from the calling telephone, the calling telephone being adapted to request communication with, to transmit a command signal to, and to transmit an inhibit signal to the receiving telephone, the receiving telephone including an indication means for providing an indication when the calling telephone requests communication and a microphone for detecting incident audio signals, wherein, in use, the calling telephone transmits a command signal to the receiving telephone upon receipt of which the receiving telephone automatically communicates said incident audio signals to the calling telephone via at least one communication medium, the receiving telephone further including inhibiting means for inhibiting the operation of the indication means, which inhibiting means is activated in use upon receipt by the receiving telephone of an inhibit signal transmitted from the calling telephone.

2. The system according to claim 1 wherein the indication means provide a visual indication.

3. The system according to claim 1 wherein the indication means provide an audible indication.

4. The system according to claim 1 wherein the inhibiting means is adapted to prevent the operation of the indication means.

5. The system according to claim 1 wherein the communication medium comprises radio.

6. A mobile telephone for communicating audio data with a calling telephone, the mobile telephone, in use, comprising a receiving telephone, the receiving telephone being adapted to receive a call from, a command signal from, and an inhibit signal from a calling telephone requesting communication with the receiving telephone, the receiving telephone further including an indication means for providing an indication when a calling telephone requests communication and a microphone for detecting incident audio signals, wherein, in use, when the receiving telephone receives from a calling telephone a command signal the receiving telephone automatically communicates said incident audio signals to the calling telephone via at least one communication medium, the receiving telephone further including inhibiting means for inhibiting the operation of the indication means, which inhibiting means is activated upon receipt by the receiving telephone of an inhibit signal transmitted from the calling telephone.

7. The mobile telephone according to claim 6 wherein the communication medium comprises radio.

8. The mobile telephone according to claim 6 wherein the indication means provide a visual indication.

9. The mobile telephone according to claim 6 wherein the indication means provide an audible indication.

10. The mobile telephone according to claim 6 wherein the inhibiting means is adapted to prevent the operation of the indication means.

11. The system according to claim 1 wherein the command signal and the inhibit signal are one electronic signal.

12. The telephone according to claim 6 wherein the command signal and the inhibit signal are one electronic signal.

* * * * *